(12) United States Patent
Riegler et al.

(10) Patent No.: US 11,928,787 B2
(45) Date of Patent: Mar. 12, 2024

(54) DEEP NOVEL VIEW SYNTHESIS FROM UNSTRUCTURED INPUT

(71) Applicant: Intel Corporation, Santa Clara, CA (US)

(72) Inventors: Gernot Riegler, Munich (DE); Vladlen Koltun, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 557 days.

(21) Appl. No.: 17/028,434

(22) Filed: Sep. 22, 2020

(65) Prior Publication Data

US 2021/0012576 A1 Jan. 14, 2021

Related U.S. Application Data (60) Provisional application No. 63/058,100, filed on Jul. 29, 2020.

(51) Int. Cl.

| | |
|---|---|
| *G06T 19/00* | (2011.01) |
| *G06F 9/38* | (2018.01) |
| *G06N 3/045* | (2023.01) |
| *G06T 3/00* | (2006.01) |
| *G06T 7/73* | (2017.01) |
| *G06T 19/20* | (2011.01) |

(52) U.S. Cl.
CPC ............ *G06T 19/20* (2013.01); *G06F 9/3877* (2013.01); *G06N 3/045* (2023.01); *G06T 3/0093* (2013.01); *G06T 7/74* (2017.01)

(58) Field of Classification Search
None
See application file for complete search history.

(56) References Cited

U.S. PATENT DOCUMENTS

| | | | | |
|---|---|---|---|---|
| 5,687,307 | A * | 11/1997 | Akisada | G06F 3/011 345/428 |
| 2004/0085325 | A1* | 5/2004 | Wang | G06T 11/001 345/582 |
| 2013/0222369 | A1* | 8/2013 | Huston | G06F 16/954 345/419 |
| 2020/0279384 | A1* | 9/2020 | Jia | G06T 7/529 |

(Continued)

OTHER PUBLICATIONS

Extended European Search Report for European Patent Application No. 22170885.2.5, dated Aug. 5, 2022, 16 pages.

(Continued)

*Primary Examiner* — Martin Mushambo
(74) *Attorney, Agent, or Firm* — Jordan IP Law, LLC (57) ABSTRACT

Systems, apparatuses and methods may provide for technology that estimates poses of a plurality of input images, reconstructs a proxy three-dimensional (3D) geometry based on the estimated poses and the plurality of input images, detects a user selection of a virtual viewpoint, encodes, via a first neural network, the plurality of input images with feature maps, warps the feature maps of the encoded plurality of input images based on the virtual viewpoint and the proxy 3D geometry, and blends, via a second neural network, the warped feature maps into a single image, wherein the first neural network is deep convolutional network and the second neural network is a recurrent convolutional network.

20 Claims, 9 Drawing Sheets

(56) References Cited

U.S. PATENT DOCUMENTS

2022/0139023 A1* 5/2022 Varekamp ............... G06T 15/40
                                                                                             345/582

OTHER PUBLICATIONS

Bernauer, "Deep Learning and GPUs: Intro and hands-on tutorial," <jics.utk.edu/files/images/csure-reu/2015/Tutorial/DNN/DNN-Intro-slide.pdf>, Jan. 1, 2017, 60 pages.

Illievski et al., "How CUDA powers the Machine Learning Revolution," 2018 26th Telecommunications Forum, Nov. 20, 2018 4 pages.

Thies et al., "Image-Guided Neural Object Rendering," <arxiv.org/pdf/1811.10720.pdf>, Jan. 15, 2020, 16 pages.

Yang et al., "Weakly-supervised Disentangling with Recurrent Transformations for 3D View Synthesis," <proceedings.neurips.cc/paper/2015/file/109a0ca3bc27f3e96597370d5c8cf03d-Paper.pdf>, Jan. 5, 2016, 9 pages.

* cited by examiner

DEEP NOVEL VIEW SYNTHESIS FROM UNSTRUCTURED INPUT

CROSS-REFERENCE TO RELATED APPLICATIONS

The present application claims the benefit of priority to U.S. Provisional Patent Application No. 63/058,100 filed on Jul. 29, 2020.

TECHNICAL FIELD

Embodiments generally relate to view synthesis. More particularly, embodiments relate to deep novel view synthesis from unstructured input.

BACKGROUND

Previously, a variety of methods have been proposed to tackle the problem of novel view synthesis from a set of input images. The proposed methods may be categorized by the restrictions on the image viewpoints and the possible deviations from the input viewpoints.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Previous approaches to conducting novel view synthesis may have involved light field, three-dimensional geometry based and/or mapping based methods. Light field methods do not require information about the scene geometry, but assume a dense camera grid, or restrict the target view to be a linear interpolation of the input viewpoints. Light field methods have the problem of a restricted input set-up and/or a restricted deviation from the input viewpoints. For example, a typical light field set-up is a number of images arranged on a 2D plane.

Three-dimensional (3D) geometry based methods gather information in the 3D geometry of the scene, or object. In the simplest case, the color information of the viewpoints observing the given point in 3D can be aggregated in the novel target view. Recently, neural features are learned on the 3D geometry that can be rendered with another neural network. Current 3D geometry-based methods rely on a rather precise 3D geometry that is difficult to obtain with current structure-from-motion and multiple view stereo methods. Due to this reason, the current renderings of these methods are not as sharp as real images of the scene.

With regard to mapping based methods, there may also exist a stream of work that uses estimated depth maps in the target view, or source views to map or "splat" the image information. Previous methods used manually tuned heuristics and Markov Random Fields to fuse the information from multiple source views in the target view. In addition, there exists recent work that blends the information using a neural network but assumes a fixed number of input mosaics generated from the source views. Mapping based methods either rely on heuristics to fuse the information from multiple images, which leads to inferior, non-photorealistic results, or restrict the number of source images that can be used for fusion. Such an approach may be problematic for large scenes where several images are used to cover a novel target view.

Embodiments provide a solution to virtual (e.g., "novel") view synthesis from unstructured input images based on recurrent mapping and blending networks. Given, for example, a video that recorded a scene, or an object, embodiments are able to render highly realistic images from novel (previously unobserved) viewpoints.

The core of the technology described herein is a recurrent mapping and blending network for photorealistic synthesis of novel views. A first convolutional network encodes the user provided source images. The image features are mapped into the target view based on a precomputed proxy geometry and camera parameters. A recurrent convolutional network fuses the arbitrary number of source features to a coherent target image by automatically weighting the influence of the different source views.

Embodiments may handle an arbitrary number of input images, which enables large deviations from the input viewpoints to be covered by automatically weighting the contributions of different viewpoints. Embodiments synthesize highly photorealistic images from novel target viewpoints and can plausibly complete missing image regions.

The quality of synthesized target views may be an important consideration for many virtual reality applications. The synthesis enables a very cost-effective alternative to a labor-intensive (semi-) manual 3D reconstruction and material estimation of the scene that would be needed to achieve a similar degree of photorealism of novel viewpoint renderings. Indeed, users themselves may more easily create and share scenes and objects for an immersive visual exploration.

The recurrent mapping and blending architecture may further be of interest for products that rely on camera arrays (e.g., INTEL Studios, INTEL Sports) to increase the level of photorealism of novel viewpoint renderings.

Photorealistic novel view synthesis from an unstructured set of input images is a unique characteristic of the proposed technology. In addition, the technology described herein is the first that enables the usage of an arbitrary number of input images to synthesize photorealistic novel views.

Figure 1:
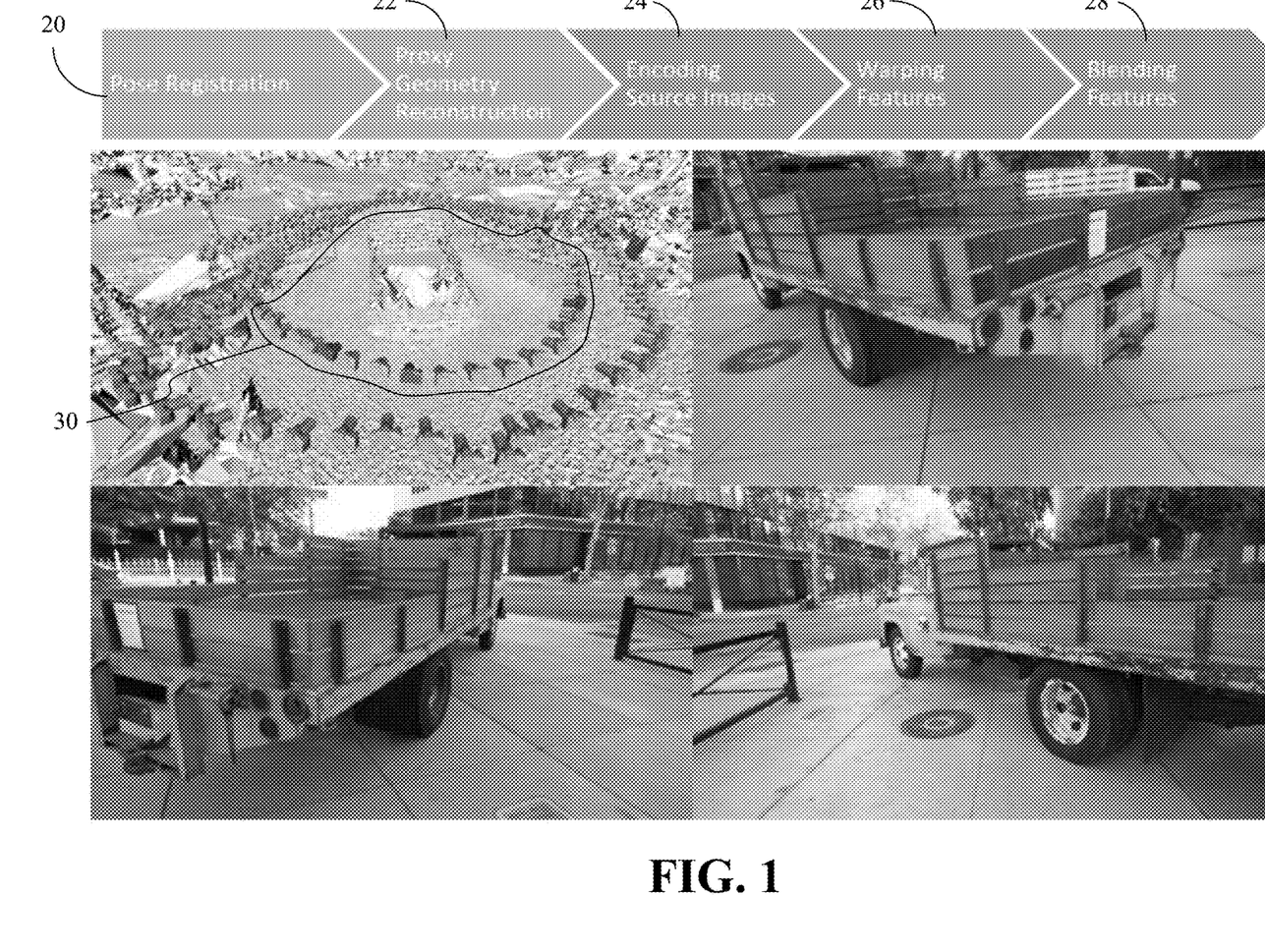
FIG. 1 is an illustration of an example of offline and online process sequences according to an embodiment.

Turning now to FIG. 1, a pose registration operation 22 and a proximity geometry operation 22 are conducted offline and are used to preprocess a novel scene (e.g., the technology reconstructs the poses of the user provided images and reconstructs a proxy 3D geometry). An encoding source images operation 24, a warping features operation 26, and a blending features operation 28 are conducted online and represent the core of the technology to synthesize a novel target view. Embodiments encode the source images with a deep convolutional network, warp the network features to the target view and then use a recurrent blending network to aggregate the image features to a novel target view. In the top left image, a first set of cameras outside a perimeter 30 relative to a scene are recorded by a user in natural motion in conjunction with the offline operations 20, 22. A second set of cameras inside the perimeter 30 denote novel target views and are associated with the online operations 24, 26, 28. The remaining images visualize results from the novel target views.

An aspect of the embodiments is a recurrent mapping and blending network for novel viewpoint synthesis. The input of the network is a set of images that record a scene or object (see, e.g., the offline camera paths in the top left image of FIG. 1). Given this input, two preprocessing steps may be performed offline.

Preprocessing

In the first preprocessing operation, the pose of each image is estimated using structure-from-motion techniques. Such an approach generates the camera intrinsic parameters and the pose (location and viewing direction) associated with each image of the input.

The second preprocessing operation reconstructs a proxy 3D geometry that is used to map image features from the source views to the novel target view. Multiple view stereo and Delaunay based meshing may be used to create a 3D mesh of the recorded scene.

Synthesizing Novel Target Views

After the preprocessing, a user may specify a virtual viewpoint (camera location and viewing direction), where embodiments synthesize a photorealistic image from the virtual viewpoint.

Figure 2:
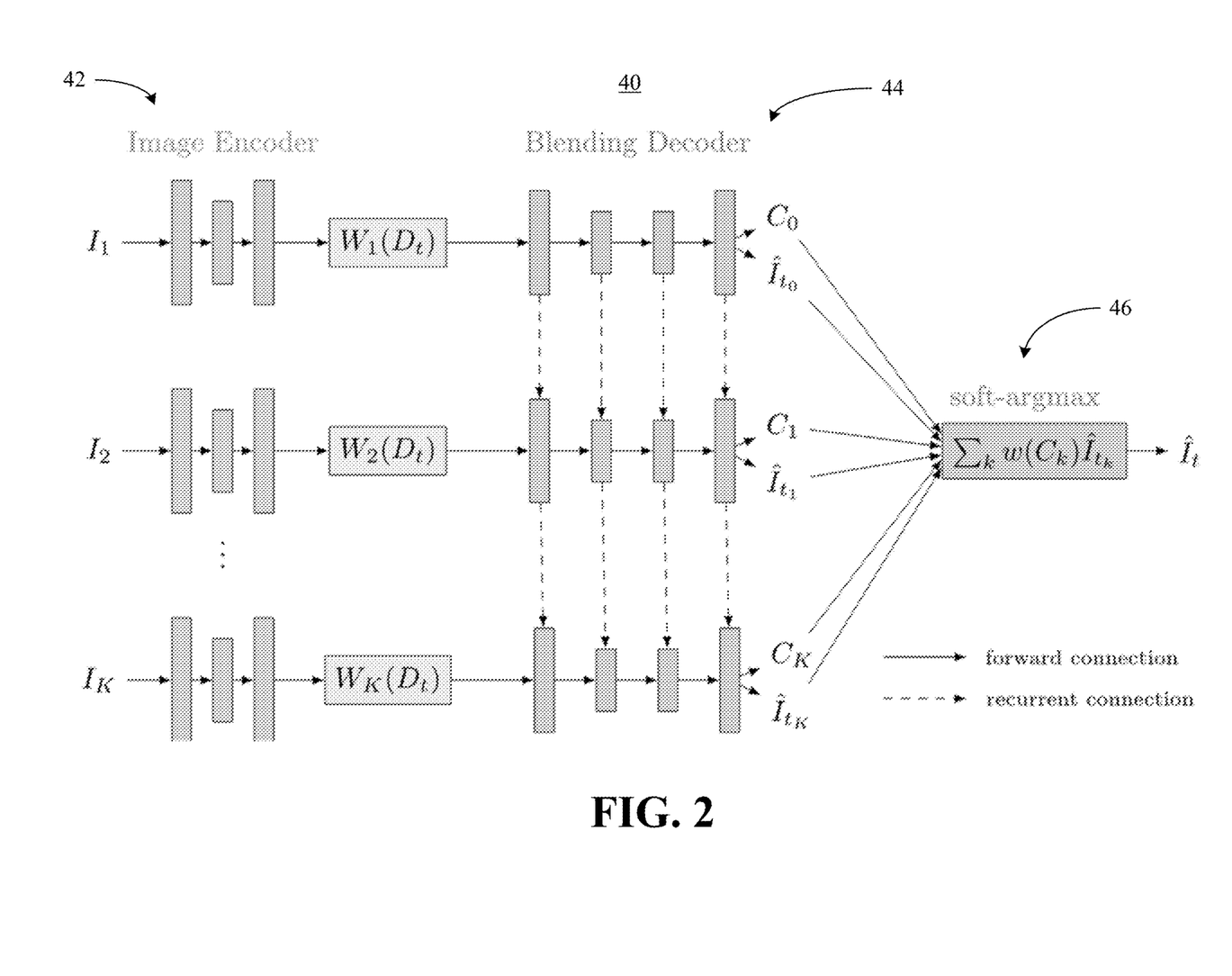
FIG. 2 is a block diagram of an example of a recurrent mapping and blending network according to an embodiment.

FIG. 2 shows a network architecture 40. First, all source images are encoded using a convolutional image encoder network 42 (e.g., deep convolutional network image encoder). The extracted feature maps are then warped into the novel target view using a warping field that is computed based on the 3D proxy geometry and the user specified viewpoint.

Finally, a blending decoder network 44 (e.g., a recurrent convolutional network) is used to aggregate the information of all source views. The recurrent architecture enables sharing of information over the number of source views. For each source image, a pixel-wise confidence and color value is output. Those outputs are then aggregated via a summation node 46 to a final image in the target view using a confidence based weighted sum. Note that this network is also able to complete missing information in the novel target view.

More particularly, given an arbitrary number of K source images $\{I_1, I_2, \ldots, I_K\}$, the image is first encoded with the image encoder network 42. The features of those encoded source images are then warped into the novel target view using the user provided viewpoint and the proxy geometry. The blending decoder network 44 is then used to blend and complete the K feature maps to a single, photorealistic image. For each source image, the architecture 40 outputs confidence values and an estimate of the target image. Using the confidence values, a final target image is created by a weighted sum.

Figure 3:
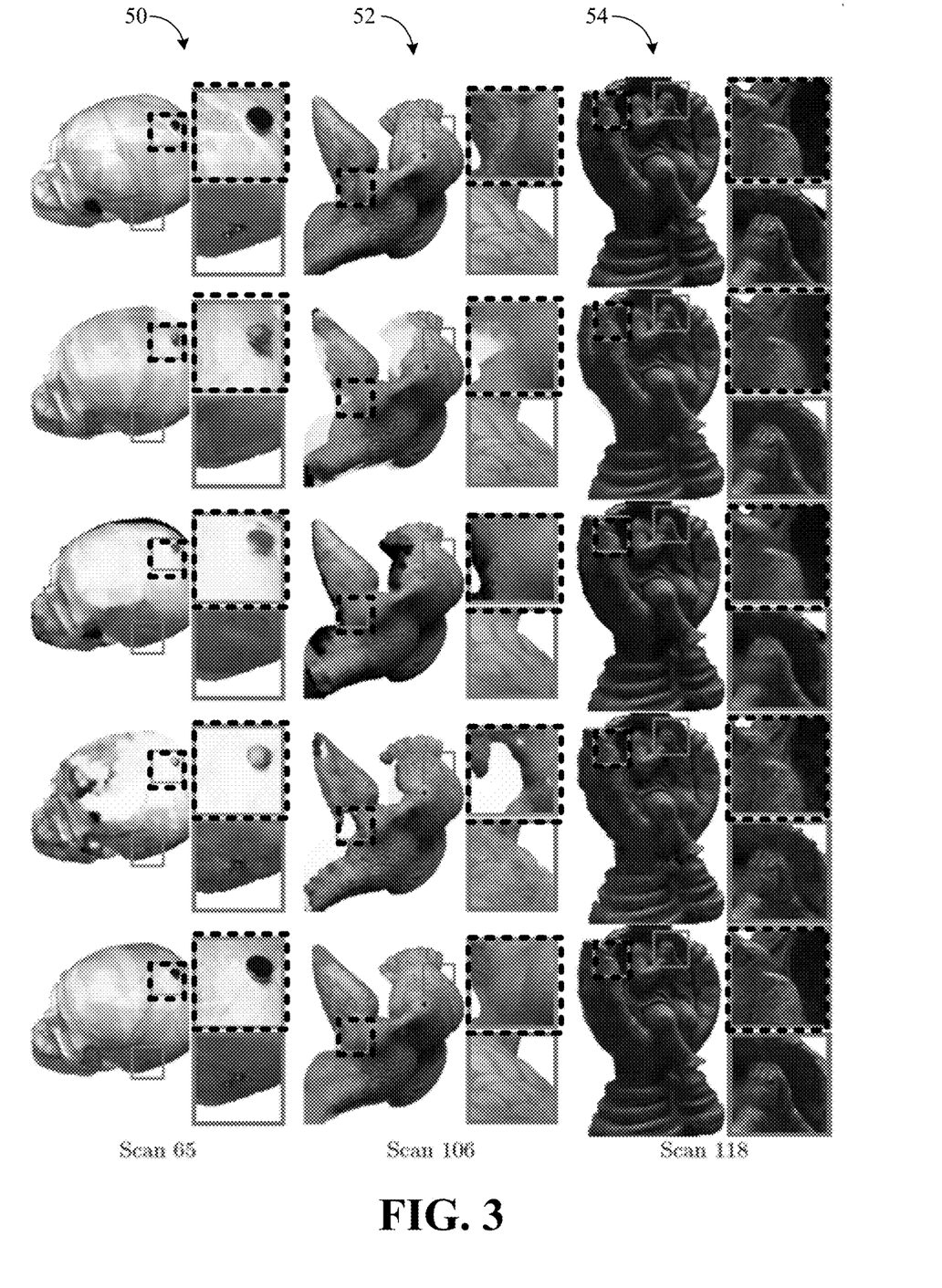
FIGS. 3-5 are comparative illustrations of examples of traditional results and enhanced results according to embodiments.
Figure 4:
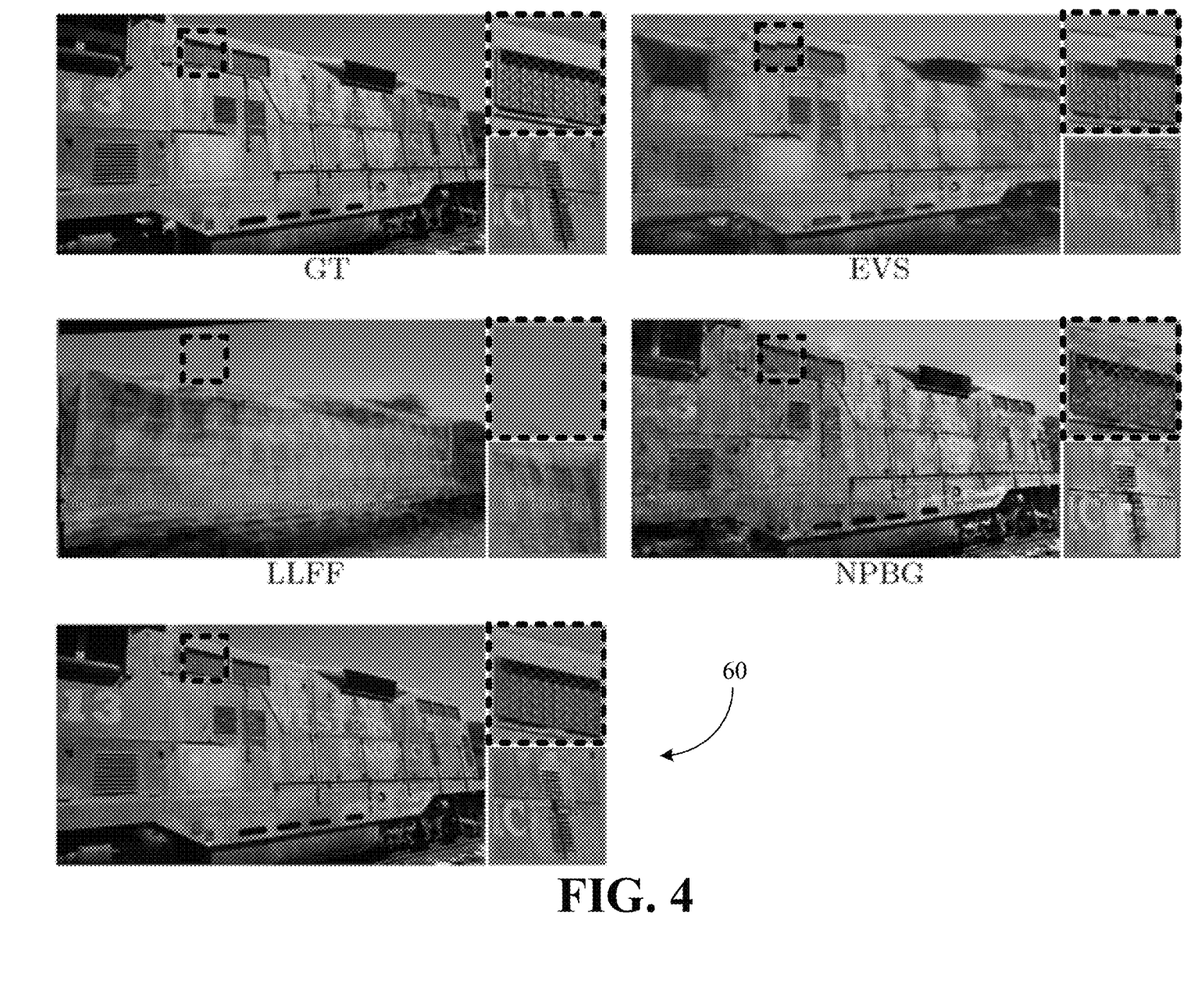
Figure 5:
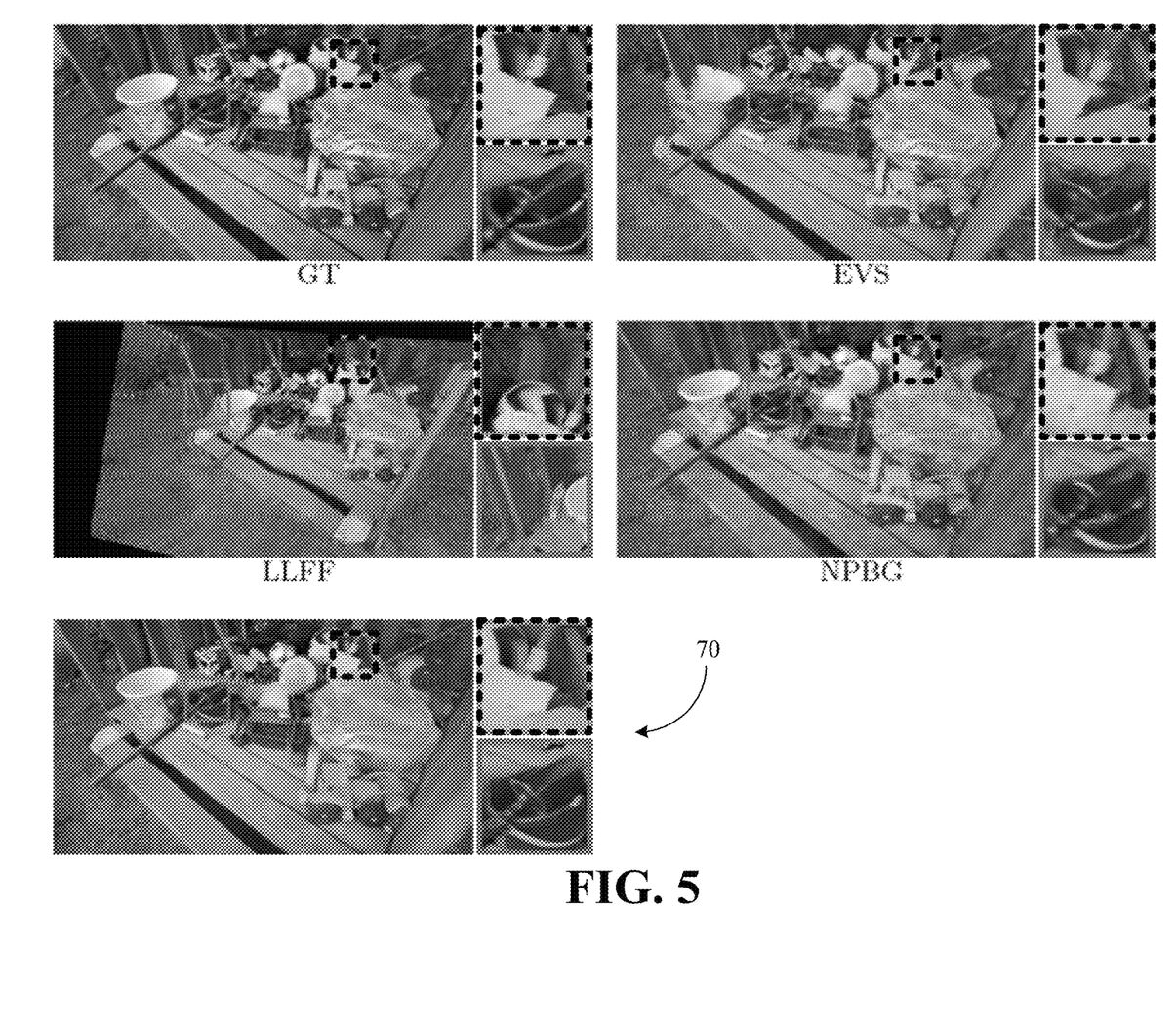

FIGS. 3-5 show results of embodiments for different scenes along with ground-truth images and estimates of other methods for a qualitative comparison. More particularly, FIG. 3 shows qualitative results of novel view synthesis on objects from the DTU (database transaction unit) benchmark. The results provide an exploded comparison between ground truth (GT, first row from the top), Extreme View Synthesis (EVS, second row from the top), Local Light Field Fusion (LLFF, third row from the top), Neural Point-Based Graphics (NPBG, fourth row from the top), and enhanced results as described herein (bottom row) for a first set of images 50, a second set of images 52, and a third set of images 54.

FIG. 4 shows qualitative results of novel view synthesis on a scene from the TANKS AND TEMPLES dataset. The results provide an exploded comparison between EVS, LLFF, NPBG, and an enhanced image 60 using the technology described herein.

FIG. 5 shows qualitative results of novel view synthesis on another scene. The results provide an exploded comparison between EVS, LLFF, NPBG, and an enhanced image 70 using the technology described herein.

Figure 6A:
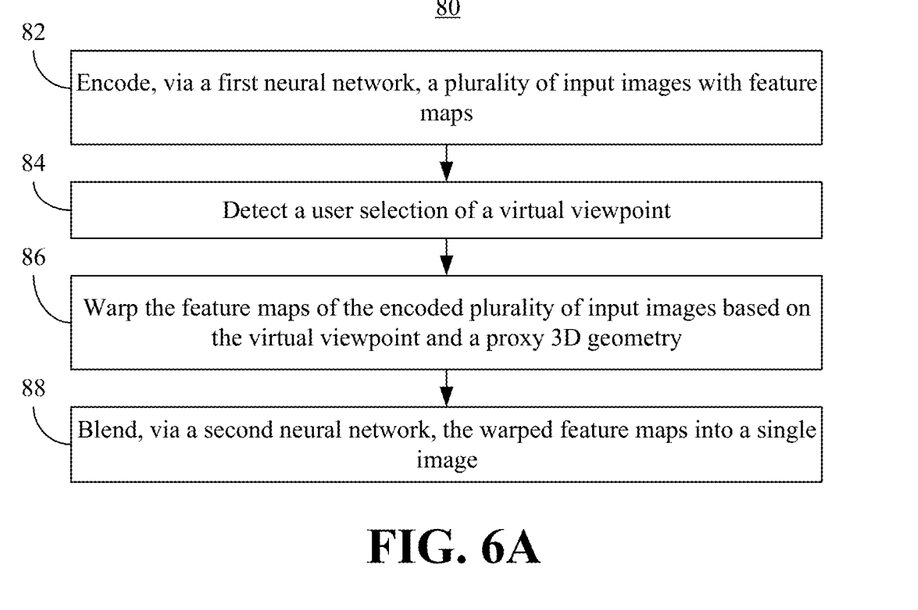
FIGS. 6A and 6B are flowcharts of examples of methods of operating performance-enhanced computing systems according to embodiments.

FIG. 6A shows a method 80 of operating a performance-enhanced computing system. The method 80 may generally be used conduct online operations such as, for example, the operations 24, 26, 28 (FIG. 1), already discussed. More particularly, the method 80 may be implemented in one or more modules as a set of logic instructions stored in a machine- or computer-readable storage medium such as random access memory (RAM), ROM, programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 80 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 82 encodes, via a first neural network, a plurality of input images with feature maps, where a user selection of a virtual viewpoint is detected at block 84. In an embodiment, block 86 warps the feature maps of the encoded plurality of input images based on the virtual viewpoint and a proxy 3D geometry. Block 86 may include determining a warping field based on the proxy 3D geometry, wherein the feature maps are warped in accordance with the warping field. Additionally, block 88 may blend, via a second neural network, the warped feature maps into a single image. In one example, the first neural network is a deep convolutional network and the second neural network is a recurrent convolutional network.

Figure 6B:
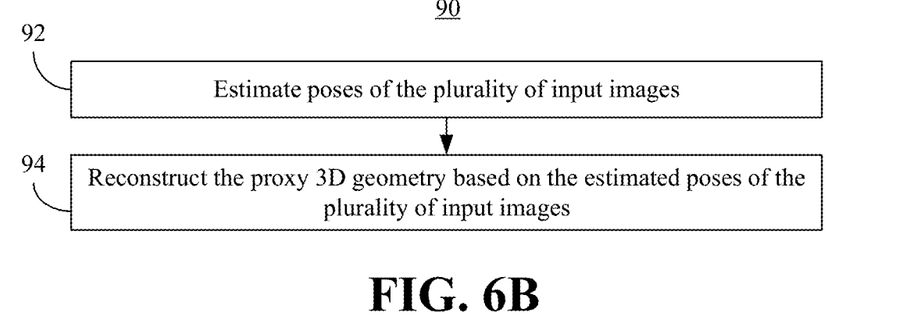

FIG. 6B shows another method 90 of operating a performance-enhanced computing system. The method 90 may generally be used conduct offline operations such as, for example, the operations 20, 22 (FIG. 1), already discussed. More particularly, the method 90 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated block 92 estimates poses of a plurality of input images. In an embodiment, block 94 reconstructs a proxy 3D geometry based on the estimated poses and the plurality of input images.

Figure 7:
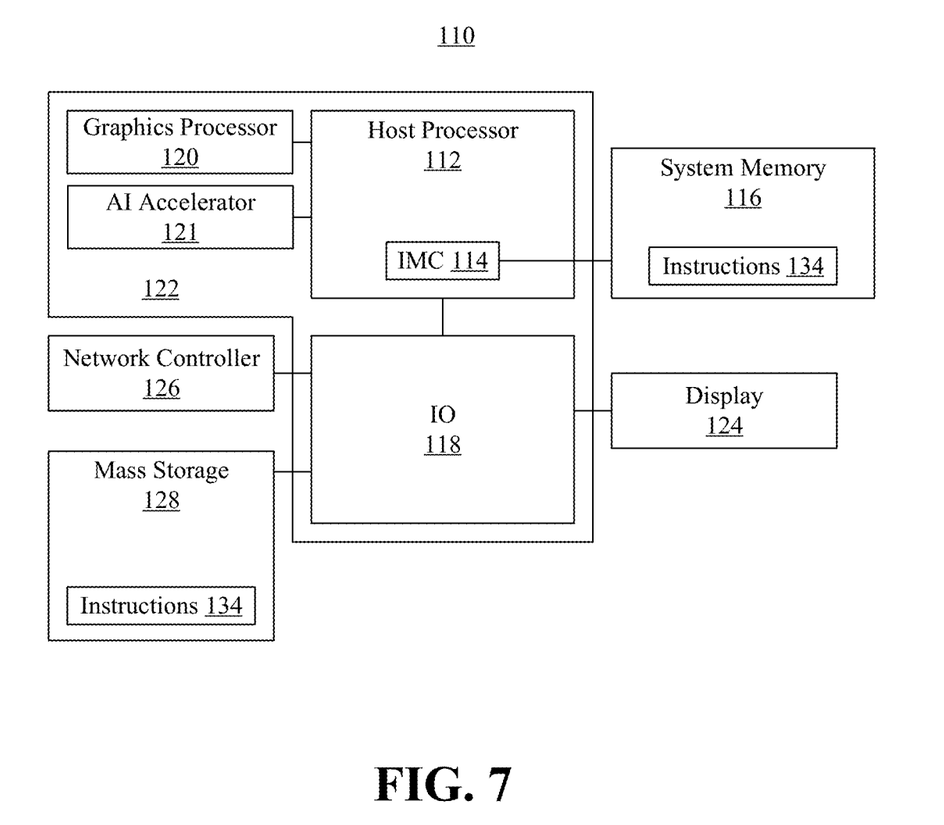
FIG. 7 is a block diagram of an example of a performance-enhanced computing system according to an embodiment.

Turning now to FIG. 7, a performance-enhanced computing system 110 is shown. The system 110 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, etc., or any combination thereof. In the illustrated example, the system 110 includes a host processor 112 (e.g., central processing unit/CPU) having an integrated memory controller (IMC) 114 that is coupled to a system memory 116.

The illustrated system 110 also includes an input output (10) module 118 implemented together with the host processor 112, an AI (artificial intelligence) accelerator 121 and a graphics processor 120 (e.g., graphics processing unit/GPU) on a semiconductor die 122 as a system on chip (SoC). In an embodiment, the semiconductor die 122 also includes a vision processing unit (VPU, not shown). The illustrated IO module 118 communicates with, for example, a display 124 (e.g., touch screen, liquid crystal display/LCD, light emitting diode/LED display), a network controller 126 (e.g., wired and/or wireless), and mass storage 128 (e.g., hard disk drive/HDD, optical disk, solid state drive/SSD, flash memory).

In an embodiment, the host processor 112, the graphics processor 120, the AI accelerator 121, the VPU and/or the IO module 118 execute program instructions 134 retrieved from the system memory 116 and/or the mass storage 128 to perform one or more aspects of the method 80 (FIG. 6A) and/or the method 90 (FIG. 6B), already discussed. Thus, execution of the instructions 134 may cause the computing system 110 to encode, via a first neural network, a plurality of input images with feature maps, warp the feature maps of the encoded plurality of input images based on a virtual viewpoint and a proxy 3D geometry, and blend, via a second neural network, the warped feature maps into a single image.

Figure 8:
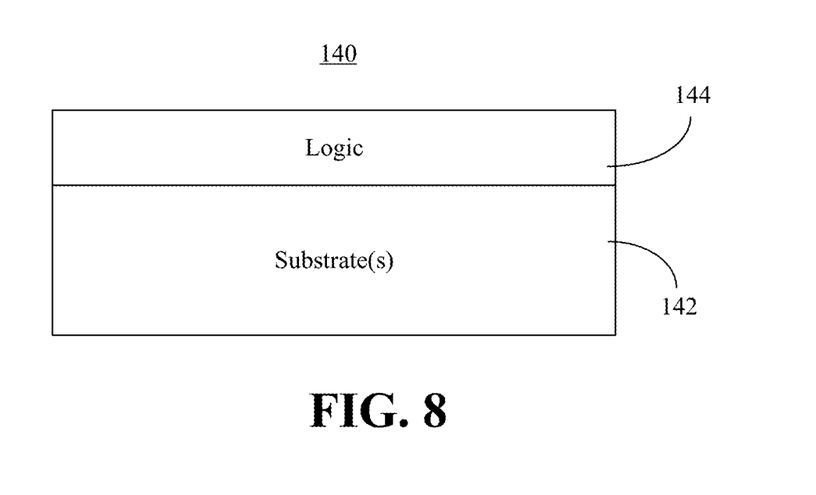
FIG. 8 is an illustration of an example of a semiconductor package apparatus according to an embodiment.

FIG. 8 shows a semiconductor package apparatus 140. The illustrated apparatus 140 includes one or more substrates 142 (e.g., silicon, sapphire, gallium arsenide) and logic 144 (e.g., transistor array and other integrated circuit/IC components) coupled to the substrate(s) 142. The logic 144 may be implemented at least partly in configurable logic or fixed-functionality logic hardware. Thus, the logic 144 might include a host processor, a graphics processor, an AI accelerator, a VPU, an IO module, etc., or any combination thereof. In one example, the logic 144 implements one or more aspects of the method 80 (FIG. 6A) and/or the method 90 (FIG. 6B), already discussed. Thus, the logic 144 may automatically encode, via a first neural network, a plurality of input images with feature maps, automatically warp the feature maps of the encoded plurality of input images based on a virtual viewpoint and a proxy 3D geometry, and automatically blend, via a second neural network, the warped feature maps into a single image.

In one example, the logic 144 includes transistor channel regions that are positioned (e.g., embedded) within the substrate(s) 142. Thus, the interface between the logic 144 and the substrate(s) 142 may not be an abrupt junction. The logic 144 may also be considered to include an epitaxial layer that is grown on an initial wafer of the substrate(s) 142.

Figure 9:
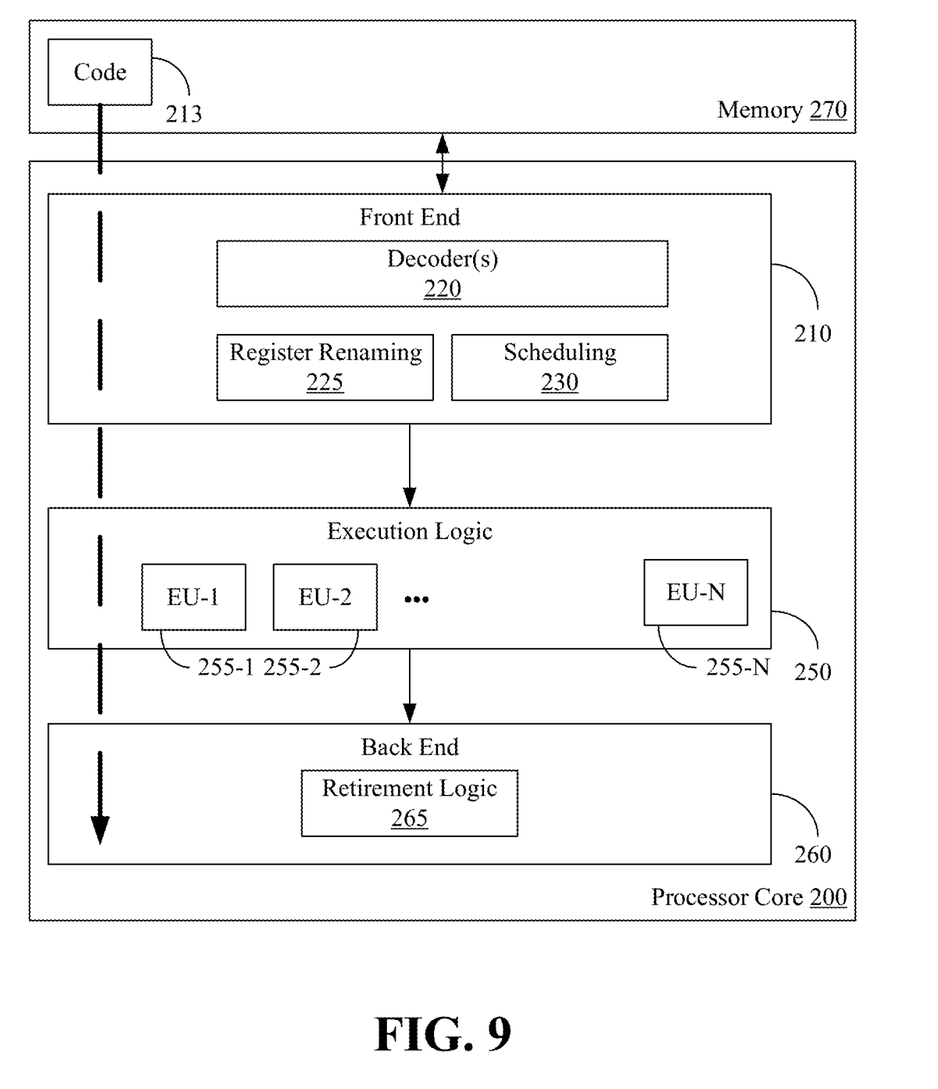
FIG. 9 is a block diagram of an example of a processor according to an embodiment.

FIG. 9 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 9, a processing element may alternatively include more than one of the processor core 200 illustrated in FIG. 9. The processor core 200 may be a single-threaded core or, for at least one embodiment, the processor core 200 may be multithreaded in that it may include more than one hardware thread context (or "logical processor") per core.

FIG. 9 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 80 (FIG. 6A) and/or the method 90 (FIG. 6B), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 9, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 10:
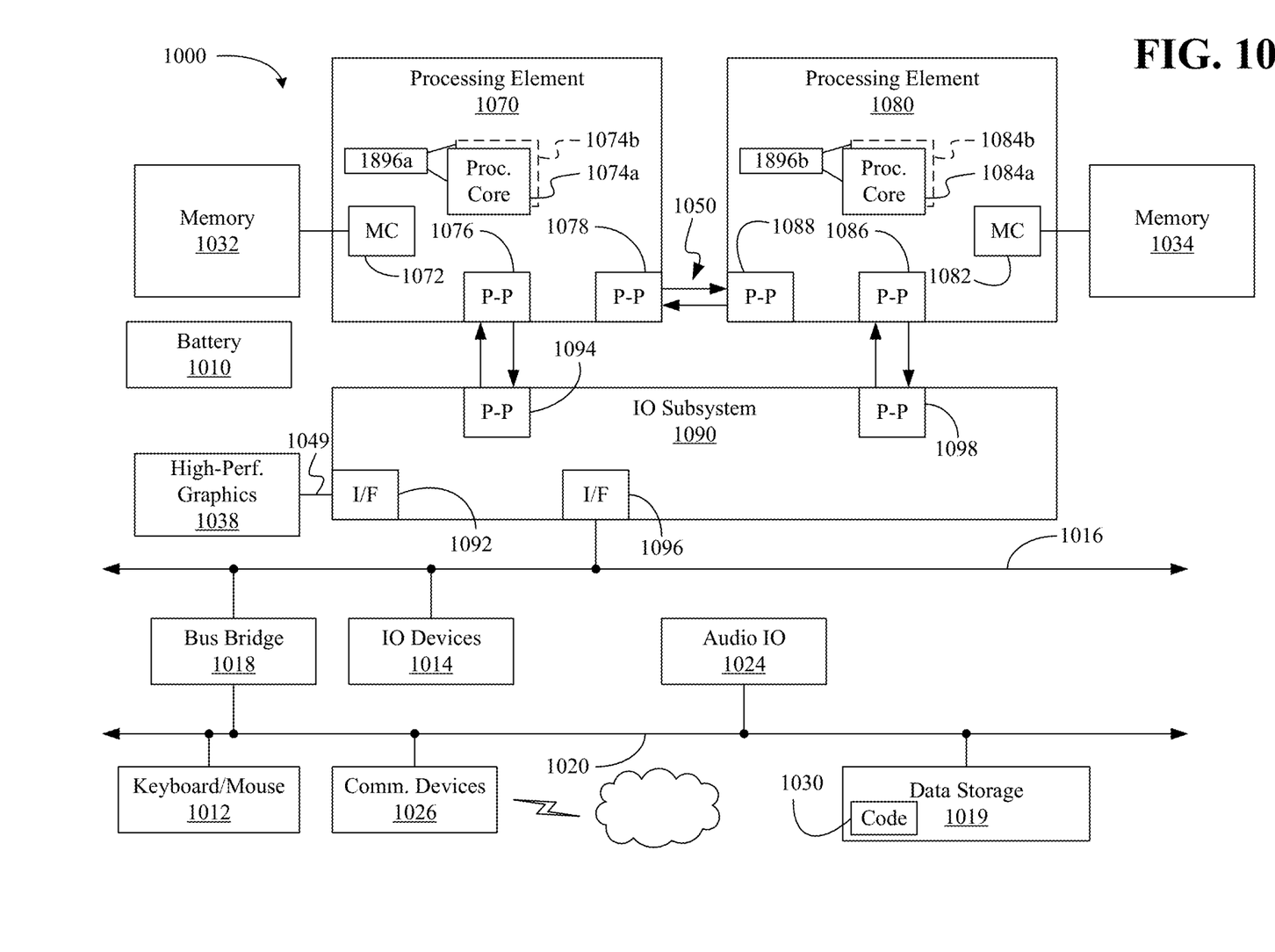
FIG. 10 is a block diagram of an example of a multi-processor based computing system according to an embodiment.

Referring now to FIG. 10, shown is a block diagram of a computing system 1000 embodiment in accordance with an embodiment. Shown in FIG. 10 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 9.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 10, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement one or more aspects of method 80 (FIG. 6A) and/or the method 90 (FIG. 6B), already discussed. Further, an audio I/O 1024 may be coupled to second bus 1020 and a battery 1010 may supply power to the computing system 1000.

Note that other embodiments are contemplated. For example, instead of the point-to-point architecture of FIG. 10, a system may implement a multi-drop bus or another such communication topology. Also, the elements of FIG. 10 may alternatively be partitioned using more or fewer integrated chips than shown in FIG. 10.

Additional Notes and Examples

Example 1 includes a performance-enhanced computing system comprising a network controller and a processor coupled to the network controller, wherein the processor includes one or more substrates and logic coupled to the one or more substrates, and wherein the logic is implemented at least partly in one or more of configurable logic or fixed-functionality hardware logic, the logic coupled to the one or more substrates to encode, via a first neural network, a plurality of input images with feature maps, warp the feature maps of the encoded plurality of input images based on a virtual viewpoint and proxy three-dimensional (3D) geometry, and blend, via the second neural network, the warped feature maps into a single image.

Example 2 includes the computing system of Example 1, wherein the logic coupled to the one or more substrates is to estimate poses of the plurality of input images.

Example 3 includes the computing system of Example 2, wherein the logic coupled to the one or more substrates is to reconstruct the proxy 3D geometry based on the estimated poses and the plurality of input images, and determine a warping field based on the proxy 3D geometry, wherein the feature maps are warped in accordance with the warping field.

Example 4 includes the computing system of Example 1, wherein the logic coupled to the one or more substrates is to detect a user selection of the virtual viewpoint.

Example 5 includes the computing system of any one of Examples 1 to 4, wherein the first neural network is a deep convolutional network.

Example 6 includes the computing system of any one of Examples 1 to 5, wherein the second neural network is a recurrent convolutional network.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to encode, via a first neural network, a plurality of input images with feature maps, warp the feature maps of the encoded plurality of input images based on a virtual viewpoint and a proxy three-dimensional (3D) geometry, and blend, via a second neural network, the warped feature maps into a single image.

Example 8 includes the apparatus of Example 7, wherein the logic coupled to the one or more substrates is to estimate poses of the plurality of input images.

Example 9 includes the apparatus of Example 8, wherein the logic coupled to the one or more substrates is to reconstruct the proxy 3D geometry based on the estimated poses and the plurality of input images, and determine a warping field based on the proxy 3D geometry, wherein the feature maps are warped in accordance with the warping field.

Example 10 includes the apparatus of Example 7, wherein the logic coupled to the one or more substrates is to detect a user selection of the virtual viewpoint.

Example 11 includes the apparatus of any one of Examples 7 to 10, wherein the first neural network is a deep convolutional network.

Example 12 includes the apparatus of any one of Examples 7 to 11, wherein the second neural network is a recurrent convolutional network.

Example 13 includes the apparatus of any one of Examples 7 to 12, wherein the logic coupled to the one or more substrates includes transistor channel regions that are positioned within the one or more substrates.

Example 14 includes at least one computer readable storage medium comprising a set of executable program instructions, which when executed by a computing system, cause the computing system to encode, via a first neural network, a plurality of input images with feature maps, warp the feature maps of the encoded plurality of input images based on a virtual viewpoint and a proxy three-dimensional (3D) geometry, and blend, via a second neural network, the warped feature maps into a single image.

Example 15 includes the at least one computer readable storage medium of Example 14, wherein the instructions, when executed, further cause the computing system to estimate poses of the plurality of input images.

Example 16 includes the at least one computer readable storage medium of Example 15, wherein the instructions, when executed, further cause the computing system to reconstruct the proxy 3D geometry based on the estimated poses and the plurality of input images, and determine a warping field based on the proxy 3D geometry, wherein the feature maps are warped in accordance with the warping field.

Example 17 includes the at least one computer readable storage medium of Example 14, wherein the instructions, when executed, further cause the computing system to detect a user selection of the virtual viewpoint.

Example 18 includes the at least one computer readable storage medium of any one of Examples 14 to 17, wherein the first neural network is a deep convolutional network.

Example 19 includes the at least one computer readable storage medium of any one of Examples 14 to 18, wherein the second neural network is a recurrent convolutional network.

Example 20 includes a method of operating a performance-enhanced computer, the method comprising encoding, via a first neural network, a plurality of input images with feature maps, warping the feature maps of the encoded plurality of input images based on a virtual viewpoint and a proxy three-dimensional (3D) geometry, and blending, via a second neural network, the warped feature maps into a single image.

Example 21 includes the method of Example 20, further including estimating poses of the plurality of input images.

Example 22 includes the method of Example 21, further including reconstructing the proxy 3D geometry based on the estimated poses and the plurality of input images, and determining a warping field based on the proxy 3D geometry, wherein the feature maps are warped in accordance with the warping field.

Example 23 includes the method of Example 20, further including detecting a user selection of the virtual viewpoint.

Example 24 includes the method of any one of Examples 20 to 23, wherein the first neural network is a deep convolutional network.

Example 25 includes the method of any one of Examples 20 to 24, wherein the second neural network is a recurrent convolutional network.

Example 26 includes means for performing the method of any one of Examples 20 to 25.

Embodiments rely on a specific input format (images with user specified target views) and are also based on a very specific recurrent network architecture. Reverse engineering may be used to detect the network operations (convolutions, nonlinearities, recurrent operations, warping) on the input data (e.g., if the network is implemented for NVIDIA graphics card in CUDA one can use cuobjdump and nvdisasm to reverse engineer the binary and derive the network operations). Similar disassemblers may be used for CPU code. In addition, most neural network codes heavily rely on specialized libraries for optimized neural network routines. By analyzing the calls to those routines, the network architecture can also be recovered.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A method for obtaining a target view of a scene from a target viewpoint, comprising:
    encoding a plurality of source images of the scene with a convolutional network to extract feature maps, wherein each of the source images is from a source viewpoint different from the target viewpoint;
    processing each of the feature maps to obtain image data for the target view, the processing comprising a transformation based on the target viewpoint and a proxy three-dimensional (3D) geometry;
    aggregating the image data over the plurality of source images to obtain the target view of the scene.

2. The method of claim 1, wherein the convolutional network comprises a deep convolutional network.

3. The method of claim 1, further comprising:
    obtaining the source viewpoint for each of the source images.

4. The method of claim 1, further comprising:
    constructing the proxy 3D geometry for transforming image features from the source images to the target view.

5. The method of claim 1, wherein processing each of the feature maps and aggregating the image data is performed at least partially by a second convolutional network different from the first convolutional network.

6. The method of claim 1, to be performed at least partially on a computing system comprising a graphical processing unit (GPU).

7. The method of claim 1, further comprising: applying the target view of the scene in a virtual reality (VR) application.

8. A non-transitory machine-readable storage medium having instructions stored thereon which, when executed by a machine, cause the machine to perform a method for obtaining a target view of a scene from a target viewpoint, the method comprising:
    encoding a plurality of source images of the scene with a convolutional network to extract feature maps, wherein each of the source images is from a source viewpoint different from the target viewpoint;
    processing each of the feature maps to obtain image data for the target view, the processing comprising a transformation based on the target viewpoint and a proxy three-dimensional (3D) geometry;
    aggregating the image data over the plurality of source images to obtain the target view of the scene.

9. The non-transitory machine-readable storage medium of claim 8, wherein the convolutional network comprises a deep convolutional network.

10. The non-transitory machine-readable storage medium of claim 8, wherein the method further comprises:
    obtaining the source viewpoint for each of the source images.

11. The non-transitory machine-readable storage medium of claim 8, wherein the method further comprises:
    constructing the proxy 3D geometry for transforming image features from the source images to the target view.

12. The non-transitory machine-readable storage medium of claim 8, wherein processing each of the feature maps and aggregating the image data is performed at least partially by a second convolutional network different from the first convolutional network.

13. The non-transitory machine-readable storage medium of claim 8, wherein the machine comprises a graphical processing unit (GPU) to performed at least a part of the method.

14. A computing system, comprising:
    a storage for storing instructions; and
    a processing logic for executing the instructions to perform a method for obtaining a target view of a scene from a target viewpoint, the method comprising:
    encoding a plurality of source images of the scene with a convolutional network to extract feature maps, wherein each of the source images is from a source viewpoint different from the target viewpoint;
    processing each of the feature maps to obtain image data for the target view, the processing comprising a transformation based on the target viewpoint and a proxy three-dimensional (3D) geometry;
    aggregating the image data over the plurality of source images to obtain the target view of the scene.

15. The computing system of claim 14, wherein the convolutional network comprises a deep convolutional network.

16. The computing system of claim 14, wherein the method further comprises:

obtaining the source viewpoint for each of the source images.

17. The computing system of claim 14, wherein the method further comprises:
constructing the proxy 3D geometry for transforming image features from the source images to the target view.

18. The computing system of claim 14, wherein processing each of the feature maps and aggregating the image data is performed at least partially by a second convolutional network different from the first convolutional network.

19. The computing system of claim 14, wherein the processing logic comprises a graphical processing unit (GPU) to perform at least a part of the method.

20. The computing system of claim 14, wherein the computing system is operable to implement a virtual reality (VR) application.

* * * * *